United States Patent
Korbmacher et al.

(10) Patent No.: US 11,466,592 B2
(45) Date of Patent: Oct. 11, 2022

(54) TURBOMACHINE HOUSING HAVING AT LEAST ONE COVER, TURBOMACHINE, METHOD FOR PRODUCING A COVER

(71) Applicant: Siemens Energy Global GmbH & Co. KG, Bayern (DE)

(72) Inventors: Lars Korbmacher, Oberhausen (DE); Marcus Meyer, Duisburg (DE); Steffen Petri, Rockstedt (DE); Kai Schickmann, Düsseldorf (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/270,023

(22) PCT Filed: Aug. 6, 2019

(86) PCT No.: PCT/EP2019/071101
§ 371 (c)(1),
(2) Date: Feb. 21, 2021

(87) PCT Pub. No.: WO2020/048713
PCT Pub. Date: Mar. 12, 2020

(65) Prior Publication Data
US 2021/0324763 A1 Oct. 21, 2021

(30) Foreign Application Priority Data
Sep. 4, 2018 (EP) .................................... 18192432

(51) Int. Cl.
*F01D 25/24* (2006.01)
(52) U.S. Cl.
CPC .......... *F01D 25/24* (2013.01); *F05D 2220/30* (2013.01); *F05D 2230/21* (2013.01); *F05D 2230/31* (2013.01); *F05D 2240/14* (2013.01)

(58) Field of Classification Search
CPC ........ F04D 17/12; F04D 29/42; F04D 29/422; F04D 29/4213; F01D 5/048; F01D 25/24;
(Continued)

(56) References Cited

U.S. PATENT DOCUMENTS

| 979,634 A | 12/1910 | Akimoff |
| 2,760,719 A | 8/1956 | Wood |

(Continued)

FOREIGN PATENT DOCUMENTS

| CN | 107664089 A | 2/2018 |
| CN | 207406500 U | 5/2018 |

(Continued)

OTHER PUBLICATIONS

PCT International Search Report and Written Opinion of International Searching Authority dated Feb. 12, 2019 corresponding to PCT International Application No. PCT/EP2019/071101 filed Jun. 8, 2019.

*Primary Examiner* — Igor Kershteyn
(74) *Attorney, Agent, or Firm* — Wolter Van Dyke Davis, PLLC

(57) ABSTRACT

A turbomachine housing, in particular of a radial turbomachine which transfers technical work to a process fluid or from a process fluid, includes: an opening extending along an axis, for the axial feed-through of a shaft extending along said axis; a contact surface extending along a circumferential direction with respect to the axis, for contact with a housing jacket of the turbomachine housing. A flow line provided as an inflow or outflow of the process fluid is designed as an integral part of the cover.

10 Claims, 2 Drawing Sheets

(58) Field of Classification Search
CPC ............. F05D 2220/30; F05D 2230/21; F05D 2230/31; F05D 2240/14; F05D 2250/51; F05D 2250/52
See application file for complete search history.

(56) References Cited

U.S. PATENT DOCUMENTS

| | | | |
|---|---|---|---|
| 2,775,945 A | | 1/1957 | Arutunoff |
| 3,131,877 A | | 5/1964 | Budzien |
| 3,825,368 A | * | 7/1974 | Benjamin ............. F04D 17/122 415/214.1 |
| 10,364,041 B2 | * | 7/2019 | Kupratis ................ B64D 41/00 |
| 2013/0034425 A1 | * | 2/2013 | Biscay .................. F04D 29/444 415/1 |
| 2014/0178119 A1 | | 6/2014 | Shinohara et al. |
| 2015/0285254 A1 | | 10/2015 | Nagahara et al. |
| 2016/0376930 A1 | | 12/2016 | Hosoya et al. |
| 2017/0030374 A1 | | 2/2017 | Huth et al. |
| 2017/0082070 A1 | | 3/2017 | Miller |
| 2018/0023589 A1 | | 1/2018 | Nakaniwa et al. |
| 2019/0101133 A1 | | 4/2019 | Okada et al. |

FOREIGN PATENT DOCUMENTS

| | | |
|---|---|---|
| EP | 1473462 A1 | 11/2004 |
| GB | 780463 A | 7/1957 |
| JP | H04347395 A | 12/1992 |
| JP | H07247989 A | 9/1995 |
| JP | H10252688 A | 9/1998 |
| JP | 2012140918 A | 7/2012 |
| JP | 2013036387 A | 2/2013 |
| JP | 2015124721 A | 7/2015 |
| JP | 2016142200 A | 8/2016 |
| JP | 2017180096 A | 10/2017 |
| RU | 2645820 C1 | 2/2018 |
| WO | 2016041841 A1 | 3/2016 |

* cited by examiner

TURBOMACHINE HOUSING HAVING AT LEAST ONE COVER, TURBOMACHINE, METHOD FOR PRODUCING A COVER

CROSS REFERENCE TO RELATED APPLICATIONS

This application is the US National Stage of International Application No. PCT/EP2019/071101 filed 6 Aug. 2019, and claims the benefit thereof. The International Application claims the benefit of European Application No. EP18192432 filed 4 Sep. 2018. All of the applications are incorporated by reference herein in their entirety.

FIELD OF INVENTION

The invention relates to a turbomachine housing, in particular of a radial turbomachine, which transfers technical work to a process fluid or from a process fluid, having: —a housing shell that has a substantially cylindrical shape, wherein the cylindrical shape extends along an axis, —a first cover that is provided axially on a first front face of the turbomachine housing so as to be removably fastened in a closing manner, —an inflow that allows a process fluid to flow into the turbomachine housing, —an outflow that allows the process fluid to flow out of the turbomachine housing.

In addition, the invention relates to a method for producing such a cover of a turbomachine housing and to a turbomachine having such a turbomachine housing.

BACKGROUND OF INVENTION

Most turbomachines experience incident flow, directed in the axial direction of the shaft, against blading or impellers by means of the process fluid. Inflow into a turbomachine housing having a cover of the type defined at the beginning usually takes place in a radial direction. To this end, the turbomachine housing generally has an inflow connector oriented radially with respect to the axis of rotation. In another possibility, which is not part of the subject matter of the invention, for example a radial compressor impeller is mounted in an overhung manner for the purpose of the axial inflow at one shaft end, as is known for example in the case of compressors for geared compressors. The radial inflow connector on the housing is associated with relatively high costs for this complicated geometry and increases the radial space requirement considerably. In addition, the necessary deflection from the radial direction into the axial direction for the inflow to the blading or the impellers is not only lossy but also takes up axial and radial installation space.

The documents WO 2016/041841 A1, U.S. Pat. Nos. 3,131,877 A, 2,760,719 A, 979,634 A, GB 780 463 A, U.S. Pat. No. 2,775,945 A, US 2017/082070 A1 to some extent disclose configuring a cover having integrated flow lines for different purposes.

SUMMARY OF INVENTION

The invention is based on the object of avoiding such drawbacks. In order to achieve the object according to the invention, a cover, a turbomachine housing, a method for producing a cover, and a turbomachine of the type defined at the beginning are proposed, having the additional characterizing features of the invention that are defined respectively in the claims. The linking element of the invention is the cover according to the invention, wherein the dependent claims contain advantageous developments of the invention.

Terms such as axial, radial, tangential or circumferential direction always relate to the central axis of the opening in the cover, or the axis of a shaft extending through the opening in the cover in the case of an already assembled turbomachine.

A main proportion of the process fluid is understood according to the invention as being a proportion of at least 51%, advantageously at least 80%, particularly advantageously 100%. In a configuration of the invention a flow line, provided as an inflow or outflow for the process fluid, is provided for at least a main proportion of the process fluid, a flow line provided as an inflow or outflow for the process fluid is configured as an integral constituent of the cover such that a main proportion of the process fluid is conducted into the interior of the turbomachine housing from the outside through the inflow of the cover, or that a main proportion of the process fluid is conducted to the outside from the interior of the turbomachine housing through the outflow of the cover.

Since the cover according to the invention has an integrated flow line that is configured as an inflow or outflow, corresponding turbomachine housings that have such a cover can otherwise be designed without a conventional inflow or outflow. The particular advantage of the novel functional modularity according to the invention is not only that it is possible to save on a corresponding flow line in a housing shell when said flow line is provided in a cover according to the invention, but also that, as a result of the feed of the process fluid in the region of the cover, the process fluid is already directed better in the direction of the inflow to the blading or the impellers before it passes into the turbomachine. In other words: According to the invention, the feed of the process fluid to the turbomachine with a cover according to the invention is already much more axial than in a conventional radial inflow through a radial inflow connector of the housing.

In an advantageous development of the invention, the cover has supply lines for a gas seal and/or oil heating and/or sensors, in particular pressure sensors, as constituents integrated in the cover. This arrangement is particularly expedient because the cover can particularly advantageously be a carrier for a shaft seal and/or a carrier for a radial bearing and/or an installation site for pressure sensors and/or temperature sensors.

In another advantageous development, the integrated flow line has channels that divide the total flow of the process fluid into partial flows. This channel structure that provides such division makes it possible, in a particularly expedient manner, to prepare the process fluid in terms of flow for the inflow to the subsequent aerodynamic component. This is generally a rotating component for example a radial compressor impeller or axial blading. The individual channels can in this case be separated from one another in the circumferential direction only by guide vanes or be configured as channels in the narrower sense with more solid channel walls that provide separation from one another in the circumferential direction. In this way, it is possible to impart a particular swirl to the process fluid flowing out of the channels, this ensuring optimal inflow to the rotor.

In a further advantageous development of the invention, a bearing block base for supporting a radial bearing for the shaft extending along the axis is configured as an integral constituent of the cover.

In a turbomachine that has a housing with a cover according to the invention provided at the front face, the cover has to fulfill numerous functions. As a rule, these functions require feed and discharge lines for different operating fluids and additionally also bushings for supply lines for electric current and for signal lines. In addition, the cover itself can also act as a carrier for numerous units to be supplied by means of these lines. For example, the cover can be a carrier for a shaft seal and the shaft bearing, in particular a carrier for a radial bearing. If, accordingly, the supply lines for these units are laid so as to run at least partially through the volume of the cover, conventional bores for the corresponding extension of the line in the cover are provided. This is very complicated, especially since corresponding bores are possible only with a straight extension axis and a separate bore has to be provided for every bend in the line extension, said bore frequently having to be closed since only an axial subregion of the bore is required for the line extension.

Conventional cutting manufacture of a cover according to the invention is comparatively difficult or complicated. The invention recognizes, as a production possibility, that the cover or parts of a casting mold of the cover can be produced advantageously by means of an additive manufacturing process. The particular degrees of freedom in the volumetrically geometric creation of free three-dimensional shapes by means of an additive manufacturing process can be exploited very readily by the invention since the optimization of the flow line in terms of flow for the inflow or outflow of a process fluid to the turbomachine through the cover can be carried out in this way without compromise. In addition, it is possible to lay the corresponding supply lines optimally as an integral constituent of the cover for shaft seals, radial bearings, oil heating and various sensors in the remaining volumetric free spaces. Supply lines for supplying a shaft seal or a gas seal, for the oil heating can be laid as lines—in a comparable manner to hoses—in the volume of the cover, such that there are virtually no restrictions for optimizing the flow line for the process fluid. A feed line for process fluid, which, as a flow line, is, according to the invention, an integral constituent of the cover, can be geometrically shaped by means of modern flow optimizers such that the process fluid is introduced first of all in a collecting annulus provided in the cover and subsequently the collecting annulus divides the total flow of the process fluid, distributed into different partial flows, between subsequent channels for supplying to the flow-conducting rotor of the turbomachine. Particularly advantageously, the collecting annulus has a cross section that is not constant around the circumference. Expediently, the collecting annulus is configured to be most spacious in the region of the inflow of the process fluid.

The flow line integrated into the cover in the case of the feed line for the process fluid to the rotor can guide the process fluid axially directly in front for example of the first impeller of a radial compressor, such that a flow-optimized inflow occurs and there is also a large saving in axial installation space.

BRIEF DESCRIPTION OF THE DRAWINGS

The invention is described in more detail in the following text on the basis of one specific exemplary embodiment with reference to the drawings, in which.

DETAILED DESCRIPTION OF INVENTION

Figure 1:
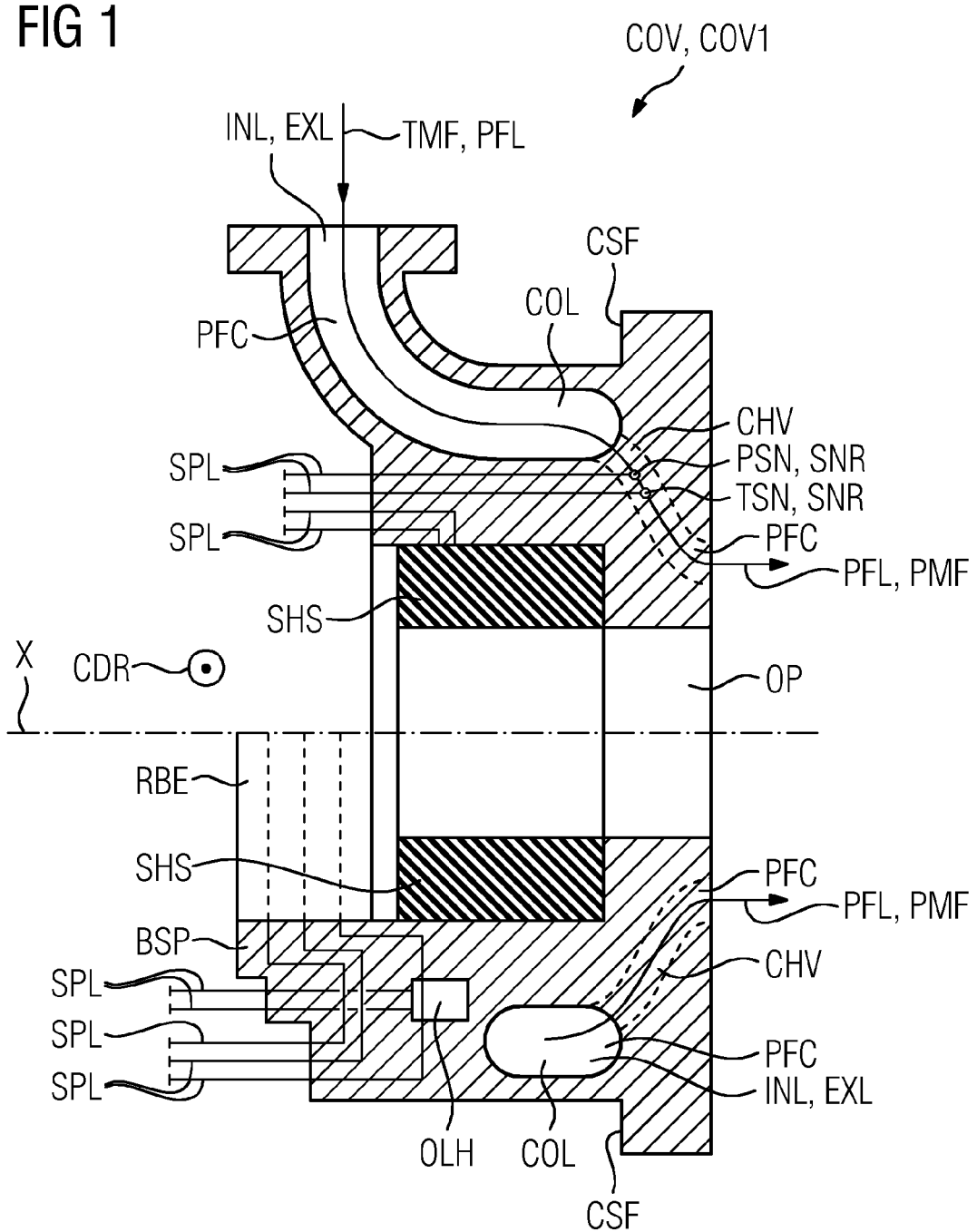
FIG. 1 shows a schematic illustration of a longitudinal section along an axis through a cover according to the invention.
Figure 2:
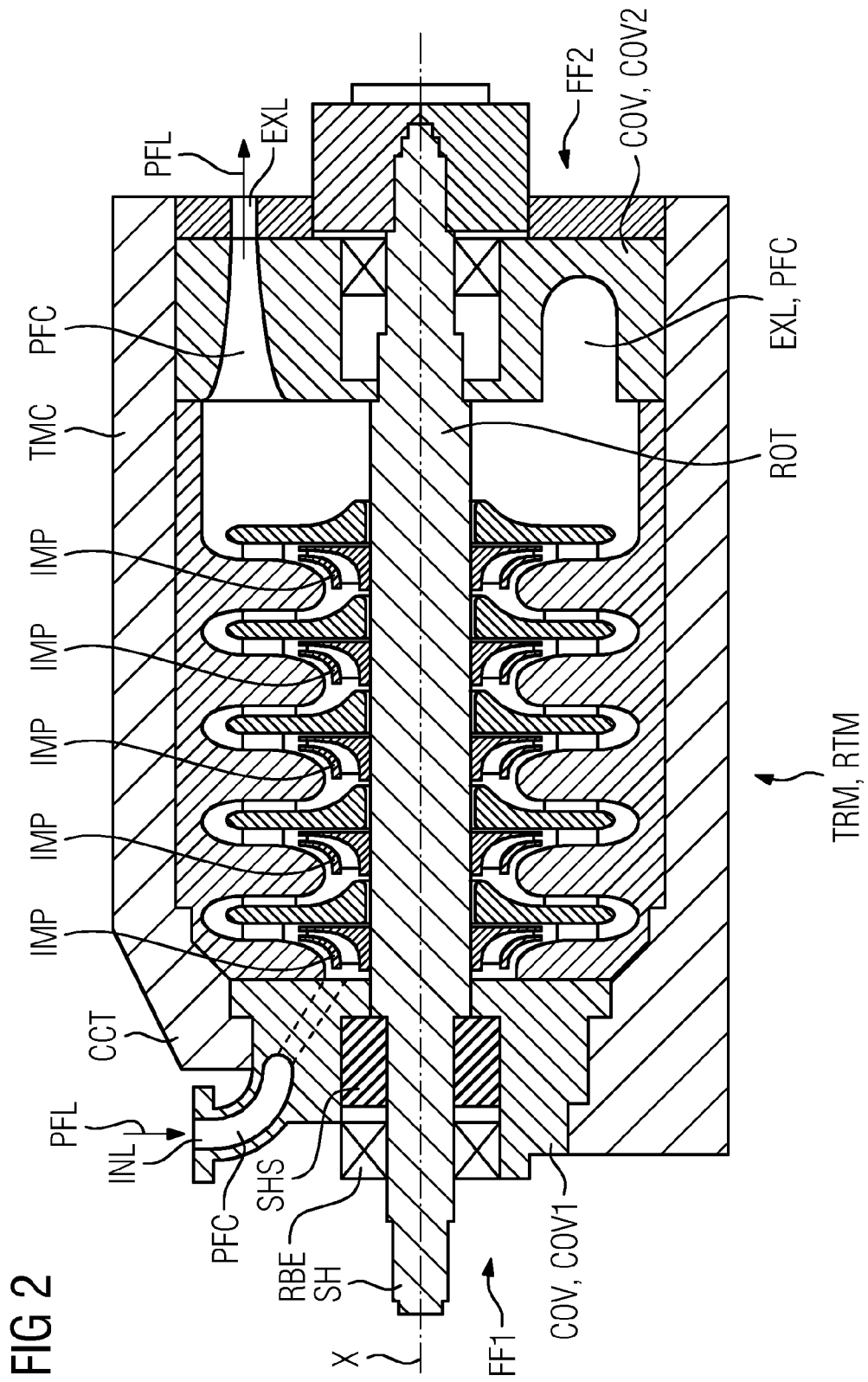
FIG. 2 shows a schematic illustration of an axial longitudinal section through a turbomachine according to the invention having a turbomachine housing according to the invention.

FIG. 1 schematically shows a longitudinal section through a cover COV according to the invention of a turbomachine housing TMC, as is illustrated in conjunction with a turbomachine TRM in FIG. 2. The turbomachine TRM illustrated in FIG. 2 is embodied as a radial turbomachine RTM, wherein the invention can also be used in principle in axial turbomachines. Identical reference signs in the figures each denote functionally identical objects.

The turbomachine TRM illustrated in FIG. 2 is a radial compressor, which transfers technical work to a process fluid PFL. Specifically, the process fluid PFL is accelerated by means of impellers IMP of a rotor ROT as it flows through and is decelerated in diffusers downstream of the corresponding impellers IMP, forming a pressure increase. Accordingly, the process fluid PFL is subject to a pressure increase after flowing in through an inflow INL into the turbomachine TRM until it exits through an outflow EXL from the turbomachine TRM. In principle, the invention is also possible for a reverse process—depressurizing a process fluid, obtaining technical work.

The cover COV illustrated in FIG. 1 has an opening OP extending along an axis X. For the axial passage of a shaft SH extending along this axis X, as is also illustrated in FIG. 2. For the purposes of contact with a housing shell CCT of the turbomachine housing TMC, the cover has a contact face SF extending in a circumferential direction CTR with respect to the axis X. The contact face serves to provide mechanical resistance to the differential pressure between the internal pressure and the ambient pressure during operation of the turbomachine and also to provide sealing with respect to an escape of process fluid PFL from the turbomachine TRM into the environment. For the purposes of sealing, it is also possible to provide sealing elements that are not illustrated here.

The cover COV has a flow line PFC, provided as an inflow INL or outflow EXL for the process fluid PFL, as an integral constituent of the cover COV. In FIG. 2, a first cover COV1 is shown on the left-hand side, which shows that a corresponding cover COV has a flow line PFC provided as inflow INL, and a second cover COV2 is reproduced on the right-hand side, which shows the case in which a flow line PFC, which is integrated into the cover COV, is configured as an outflow EXL for the process fluid PFL. The first cover COV1 is located on a first front face FF1 of the turbomachine housing TMC and the second cover COV2 is located on a second front face FF2.

FIG. 1 shows the first cover COV1 with the flow line PFC, configured as an inflow INL, for the process fluid PFL, which is provided on the first front face FF1 in FIG. 2. The cover COV or the first cover COV1, which is illustrated in FIG. 1, has been produced by additive manufacturing, as has the second cover COV2. This production process allows particularly free design of the three-dimensional geometry of the various functional elements of the cover COV. The first cover COV1 is a carrier of additional functional elements, for example oil heating OLH, a radial bearing RBE and a shaft seal SHS, which is in the form of a gas seal. Supply lines SPL are provided for the shaft seal SHS, the radial bearing RBE and sensors SNR, a temperature sensor TSN and a pressure sensor PSN for measuring the pressure and temperature of the process fluid PFL in the inflow INL. The oil heating OLH prepares bearing oil for supplying the radial bearing RBE, wherein the supply lines SPL for this oil heating OLH are an integral constituent of the cover COV. These supply lines SPL for the oil heating OLH can, for the one part, provide electrical heating, and, for the other part, feed a heated fluid to the oil heating OLH or convey it away from the oil heating OLH.

The flow line PFC, which can be configured as a feed line INL or as a discharge line EXL, comprises a collecting space COL (collecting annulus), which extends substantially in an annular manner in the circumferential direction CDR about the axis X, and individual channels CHV that extend from this collecting space and feed the process fluid PFL in an optimally oriented manner in terms of flow to the subsequent blading or impellers IMP of the rotor ROT. The collecting space COL has a cross section that is not constant around the circumference.

The invention claimed is:

1. A turbomachine housing which transfers technical work to a process fluid or from a process fluid, comprising:
    a housing shell that has a substantially cylindrical shape, wherein the cylindrical shape extends along an axis,
    a first cover that is provided axially on a first front face of the turbomachine housing so as to be removably fastened in a closing manner,
    an inflow that allows a process fluid to flow into the turbomachine housing,
    an outflow that allows the process fluid to flow out of the turbomachine housing,
    wherein the first cover comprises:
        an opening, extending along the axis, for the axial passage of a shaft extending along this axis,
        a contact face, extending in a circumferential direction with respect to the axis, for contact with the housing shell of the turbomachine housing,
    wherein a flow line, provided as the inflow or outflow for the process fluid, is configured as an integral constituent of the cover,
    wherein the cover is arranged radially inside the housing shell by means of the contact face, wherein the cover is arranged with the contact face against an axial inner face of a radial inner flange of the housing shell.

2. The turbomachine housing as claimed in claim 1, wherein supply lines for a shaft seal, a gas seal and/or a shaft bearing and/or oil heating and/or sensors, and/or pressure sensors, are integrated in the cover.

3. The turbomachine housing as claimed in claim 1, wherein the integrated flow line has channels that divide the total flow of the process fluid into partial flows.

4. The turbomachine housing as claimed in claim 3, wherein the channels are formed such that the process fluid flowing out of the channels has a particular swirl imparted to it.

5. The turbomachine housing as claimed in claim 1, wherein a bearing block base for supporting a radial bearing for the shaft extending along the axis is configured as an integral constituent of the cover.

6. The turbomachine housing as claimed in claim 1, wherein the cover or parts of a casting mold of the cover have been produced by means of an additive manufacturing process.

7. A method for producing the cover of the turbomachine housing as claimed in claim 1,
    wherein the cover or parts of a casting mold of the cover are produced by means of an additive manufacturing process.

8. A turbomachine, comprising:
    a rotor and a turbomachine housing,
    wherein the turbomachine housing is configured as claimed in claim 1.

9. The turbomachine housing as claimed in claim 1, wherein the turbomachine housing is of a radial turbomachine.

10. The turbomachine as claimed in claim 8, wherein the turbomachine comprises a radial turbomachine.

* * * * *